United States Patent
Woodruff

(10) Patent No.: US 6,732,166 B1
(45) Date of Patent: May 4, 2004

(54) METHOD OF DISTRIBUTED RESOURCE MANAGEMENT OF I/O DEVICES IN A NETWORK CLUSTER

(75) Inventor: Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/322,183

(22) Filed: May 28, 1999

(51) Int. Cl.$^7$ .................................................. G06F 3/00
(52) U.S. Cl. ........................... 709/221; 709/226; 714/4; 710/19
(58) Field of Search ................................ 710/8, 10, 19, 710/15, 17, 18; 709/104, 226, 223, 224, 221; 714/4

(56) References Cited

U.S. PATENT DOCUMENTS

| | | | |
|---|---|---|---|
| 4,371,932 A | * 2/1983 | Dinwiddie et al. ........... 710/21 |
| 4,644,468 A | * 2/1987 | Doster et al. ................ 709/220 |
| 4,893,302 A | * 1/1990 | Hemmady et al. .......... 370/427 |
| 5,155,857 A | * 10/1992 | Kunisaki et al. ............. 709/223 |
| 5,655,081 A | * 8/1997 | Bonnell et al. .............. 709/202 |
| 5,717,950 A | * 2/1998 | Yamaguchi et al. ........ 707/102 |
| 6,047,353 A | * 4/2000 | Vishlitzky et al. ........... 711/111 |
| 6,049,853 A | * 4/2000 | Kingsbury et al. .......... 709/213 |
| 6,055,570 A | * 4/2000 | Nielsen ....................... 709/224 |
| 6,067,545 A | * 5/2000 | Wolff .......................... 370/238 |
| 6,088,727 A | * 7/2000 | Hosokawa et al. .......... 709/223 |
| 6,185,203 B1 | * 2/2001 | Berman ....................... 370/351 |
| 6,192,483 B1 | * 2/2001 | Moiin et al. .................... 714/4 |
| 6,240,451 B1 | * 5/2001 | Campbell et al. ........... 709/224 |
| 6,275,874 B1 | * 8/2001 | Wilson ........................... 710/8 |
| 6,282,569 B1 | * 8/2001 | Wallis et al. ................ 709/224 |
| 6,343,320 B1 | * 1/2002 | Fairchild et al. ............ 709/224 |
| 6,353,612 B1 | * 3/2002 | Zhu et al. .................... 370/360 |
| 6,470,397 B1 | * 10/2002 | Shah et al. .................. 709/250 |

\* cited by examiner

*Primary Examiner*—David Wiley
*Assistant Examiner*—George Neurauter
(74) *Attorney, Agent, or Firm*—Christopher K. Gagne

(57) ABSTRACT

I/O resources are allocated to one or more hosts in a network cluster. Each host stores a cluster resource table (CRT) that identifies the configuration and allocation of I/O resources within its cluster. Each host includes an I/O resource management agent (RMA) within the operating system. A host's RMA obtains a list of all hosts and I/O units and their network addresses from the fabric services. The RMA then queries each host to obtain at least a portion of the CRTs of each of the host's in the cluster. The RMA replaces its local CRT with the most current version of the CRT (e.g., based on a time and date stamp or version number of each CRT). The host's RMA then queries each I/O unit to identify the I/O controllers and their controller number in the cluster. The RMA then queries each I/O controller in the cluster to identify the I/O devices in the cluster. The RMA then updates its CRT based on this information. The RMA can provide the updated CRT to each of the hosts in the cluster.

22 Claims, 5 Drawing Sheets

SAN CLUSTER MEMBERSHIPS

FIG. 3

EXAMPLE OF NETWORK TOPOLOGY INFORMATION STORED
BY FABRIC SERVICES DATABASE 204

| ROW /302 | GUID /304 | DEV. TYPE /306 | MAC ADDR. /308 | CLUSTER /310 | OWNERSHIP /312 |
|---|---|---|---|---|---|
| 1 | HOST108 | HOST | ADDR_FOR_108 | A | NA |
| 2 | HOST110 | HOST | ADDR_FOR_110 | A | NA |
| 3 | I/OU112 | I/OUNIT | ADDR_FOR_112 | A | SHARED-HOST108,HOST110 |
| 4 | I/OU118 | I/OUNIT | ADDR_FOR_118 | A | DED.-HOST 110 |
| 5 | HOST130 | HOST | ADDR_FOR_130 | B | NA |
| 6 | I/OU132 | I/OUNIT | ADDR_FOR_132 | B | DED.-HOST130 |
| 7 | I/OU138 | I/OUNIT | ADDR_FOR_138 | B | DED.-HOST130 |

TIME & DATE STAMP (INDICATING TIME AND DATE OF LAST UPDATE BY I/O DEVICE ALLOCATION APPLICATION 210):

314 / TIME: 06:32:44
DATE: 05/01/90

FIG. 4

EXAMPLE OF CLUSTER RESOURCE TABLE (CRT) STORED BY A HOST

CLUSTER A

| ROW /402 | GUID /404 | TYPE /406 | NIC MAC ADDR. /408 | IOC/IOD NUMBER /410 | PARENT /412 | OWNERSHIP /414 |
|---|---|---|---|---|---|---|
| 1 | HOST108 | HOST | NIC_ADDR_108 | NA | CLUSTER A | NA |
| 2 | HOST110 | HOST | NIC_ADDR_110 | NA | CLUSTER A | NA |
| 3 | I/OU112 | I/OUNIT | NIC_ADDR_112 | NA | CLUSTER A | SHARED-HOST108, HOST110 |
| 4 | I/OC114A | I/O CONTROLLER | NIC_ADDR_112 | I/OC1 | I/OU112 | SHARED-HOST108, HOST110 |
| 5 | I/OD116A1 | I/O D-HDD | NIC_ADDR_112 | I/OD1 | I/OC114A | DED.-HOST 108 |
| 6 | I/OD116A2 | I/O D-HDD | NIC_ADDR_112 | I/OD2 | I/OC114A | DED.-HOST110 |
| 7 | I/OC114B | I/O CONTROLLER | NIC_ADDR_112 | I/OC2 | I/OU112 | SHARED-HOST108, HOST110 |
| 8 | I/OD116B1 | I/O D-HDD | NIC_ADDR_112 | I/OD1 | I/OC114B | SHARED-HOST108, HOST110 |
| 9 | I/OU118 | I/OUNIT | NIC_ADDR_118 | NA | CLUSTER A | DED.-HOST110 |
| 10 | I/OC120 | I/O CONTROLLER | NIC_ADDR_118 | I/OC1 | I/OU118 | DED.-HOST110 |
| 11 | I/OD122A | I/O D-HDD | NIC_ADDR_118 | I/OD1 | I/OC120 | DED.-HOST110 |

TIME & DATE STAMP (INDICATING TIME AND DATE OF LAST UPDATE):
    TIME: 07:39:44
420 /DATE: 05/01/90

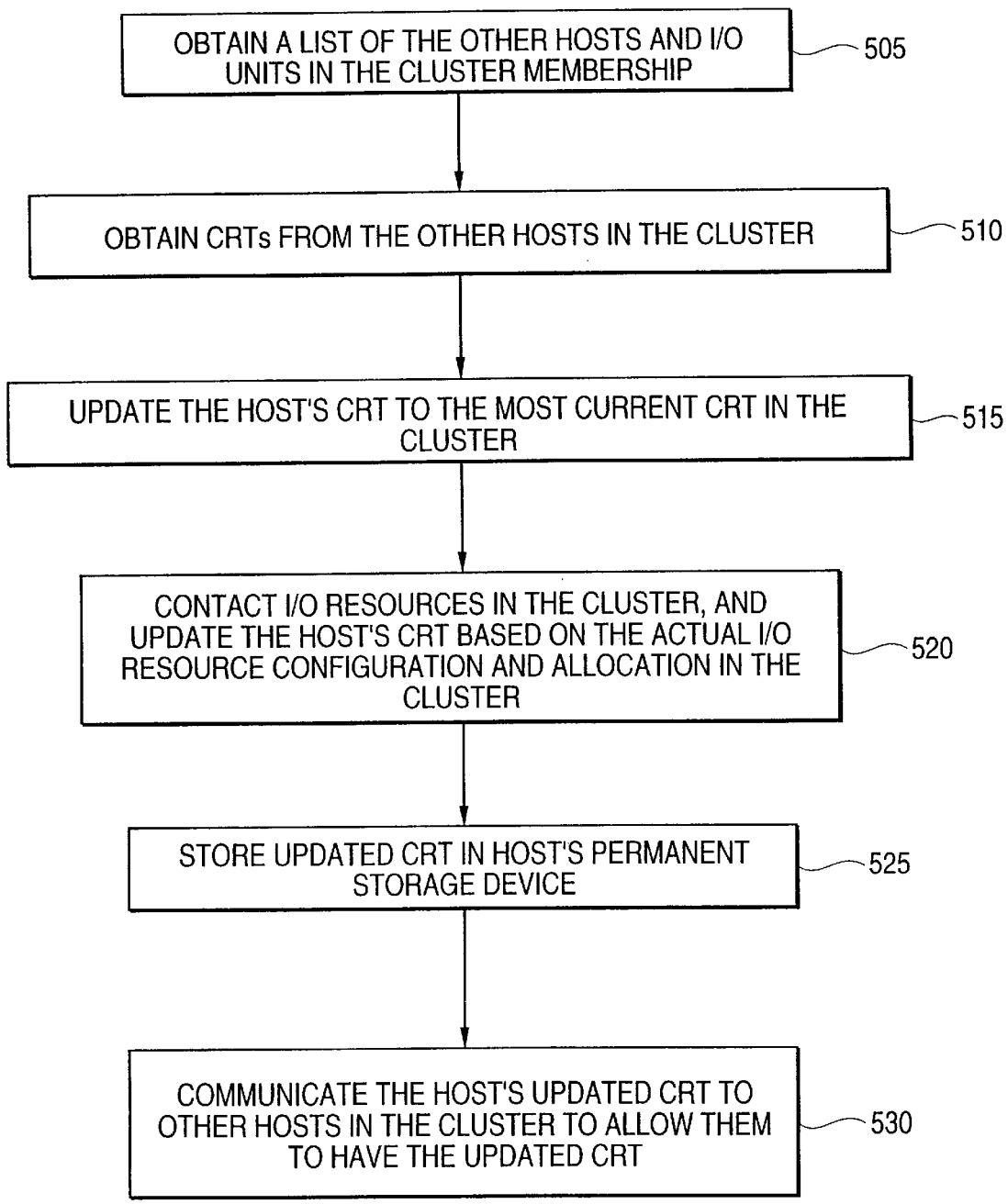

METHOD OF DISTRIBUTED RESOURCE MANAGEMENT OF I/O DEVICES IN A NETWORK CLUSTER

FIELD

The invention generally relates to data networks and in particular to a method of distributed resource management of I/O devices in a network cluster.

BACKGROUND

In a typical stand-alone computer, all I/O devices are owned exclusively by that computer. Thus, I/O resources are not shared or available to any other computers in such a system and I/O resource allocation is not a problem. However, in a network cluster where there are distributed I/O resources which can be shared among multiple hosts, it may be unclear which I/O resources are available to each host. Thus, in a network of shared I/O resources and multiple hosts, it is important for each host to identify the I/O devices in the cluster that are allocated to it at boot up (or when the host connects to the network), and to maintain an updated list of its I/O resources. However, most clustered systems typically do not provide a flexible technique for allocating various I/O resources among the various hosts in the cluster. Moreover, most clustering systems also do not provide an efficient technique for providing I/O resource allocation updates to each host within the cluster.

Thus, a need exists for improved techniques for allocating I/O resources in a cluster and for allowing each host to efficiently obtain updated information describing the allocation of I/O resources.

SUMMARY

According to an embodiment of the present invention, a method is provided for updating a local I/O resource table at a host in a network cluster. The I/O resource table identifies the configuration and the allocation of I/O resources in the network cluster. A list is obtained of other hosts in a network cluster including their addresses. A connection is established to one or more of the other hosts in the cluster and at least a portion of an I/O resource table from one or more of the other hosts in the network is obtained. The most current I/O resource table from the other hosts in the cluster is identified, and the host's local I/O resource table is updated based on the most current I/O resource table.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 3 illustrates an example of the type of information stored in a fabric services database according to an embodiment of the present invention.

FIG. 4 illustrates an example of the type of information stored in a cluster resource table according to an embodiment of the present invention.

FIG. 5 is a flow chart illustrating the process of updating a cluster resource table according to an embodiment of the present invention.

DETAILED DESCRIPTION

Network Architecture

Figure 1:
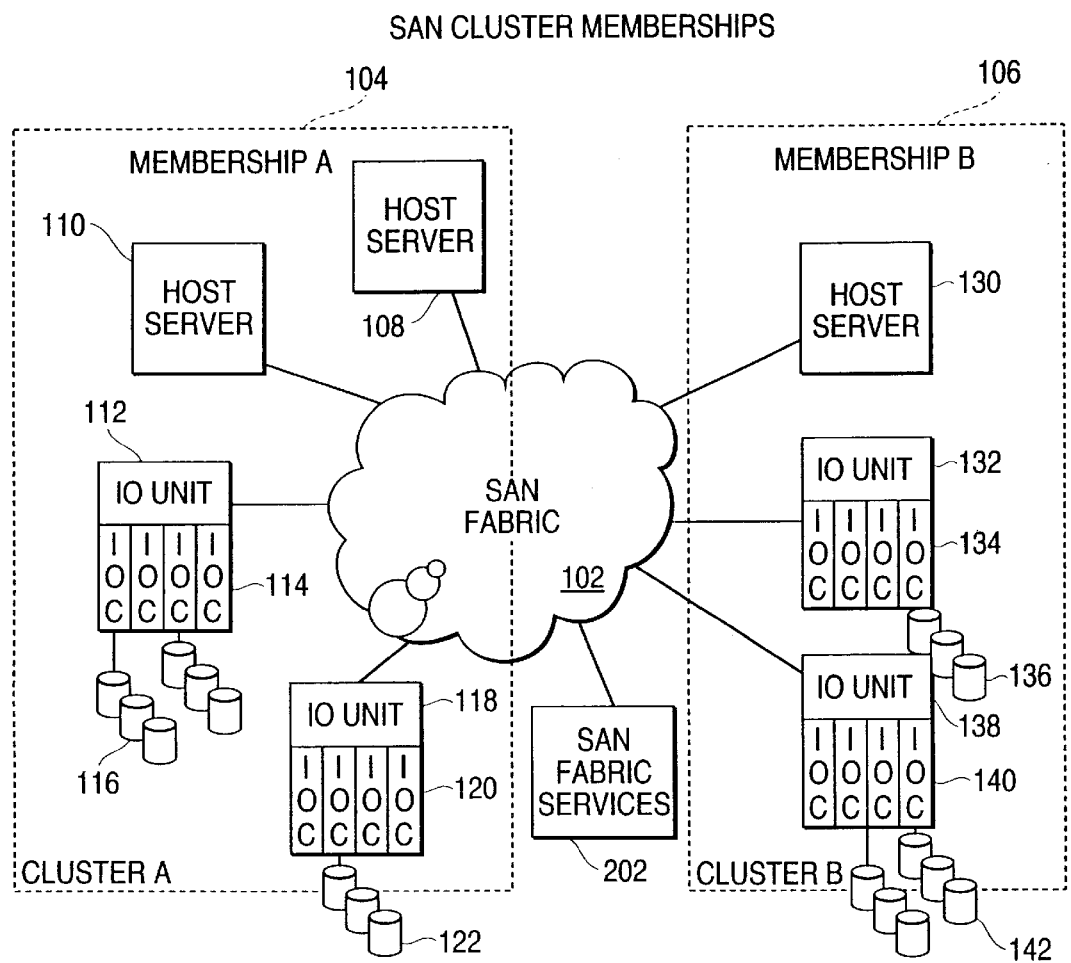
FIG. 1 is a block diagram illustrating an example network according to an embodiment of the present invention.

Referring to the figures in which like numerals indicate like elements, FIG. 1 is a block diagram illustrating an example network according to an embodiment of the present invention. A network is shown and may be a storage area network (SAN) or other network. SAN 100 includes several hosts (or host servers) and input/output (I/O) resources (such as I/O units or I/O devices) which are interconnected via the SAN fabric 102. SAN fabric 102 may be a collection of switches that are interconnected via communication links. SAN 100 also includes a SAN fabric services 202 which may be located on any host or on a dedicated network management host. SAN fabric services 202 provides some control and management functions for the SAN 100.

In SAN 100 of FIG. 1, the various hosts and I/O units can be grouped into clusters (also known as memberships). Referring to the example network of FIG. 1, cluster A 104 includes hosts 108 and 110 and I/O units 112 and 118, each being connected to SAN fabric 102. I/O unit 112 includes several I/O controllers 114 connected thereto. Each I/O controller 114 includes one or more I/O devices 116 connected to it. I/O unit 118 includes several I/O controllers 120. Each I/O controller 120 includes several I/O devices 122 connected thereto. Although cluster A 104 includes two hosts and two I/O units merely as an example, cluster A 104 may include any number of hosts and I/O units.

Similarly, cluster B 106 includes host 130 and I/O units 132 and 138. I/O unit 132 includes several connected I/O controllers 134, each I/O controller 134 including one or more connected I/O devices 136. I/O unit 138 includes one or more I/O controllers 140 connected to it. Each I/O controller 140 includes one or more connected I/O devices 142. Although cluster B includes only one host and two I/O units as illustrated in the example network in FIG. 1, cluster B can include any number of hosts and I/O units. The SAN 100 illustrated in FIG. 1 is provided merely as an example of a SAN in order to describe the many aspects of the present invention.

In a very simple embodiment, a SAN may include only one cluster. However, it may be desirable to organize the various hosts and I/O units into several groups or clusters. For example, hosts and I/O units can be grouped or clustered on the basis of a common or homogeneous operating system to allow easier communication between hosts and between hosts and I/O units. For example, hosts in a first cluster may be executing or using a first operating system while hosts in a second cluster may be executing or using a second operating system.

Figure 2:
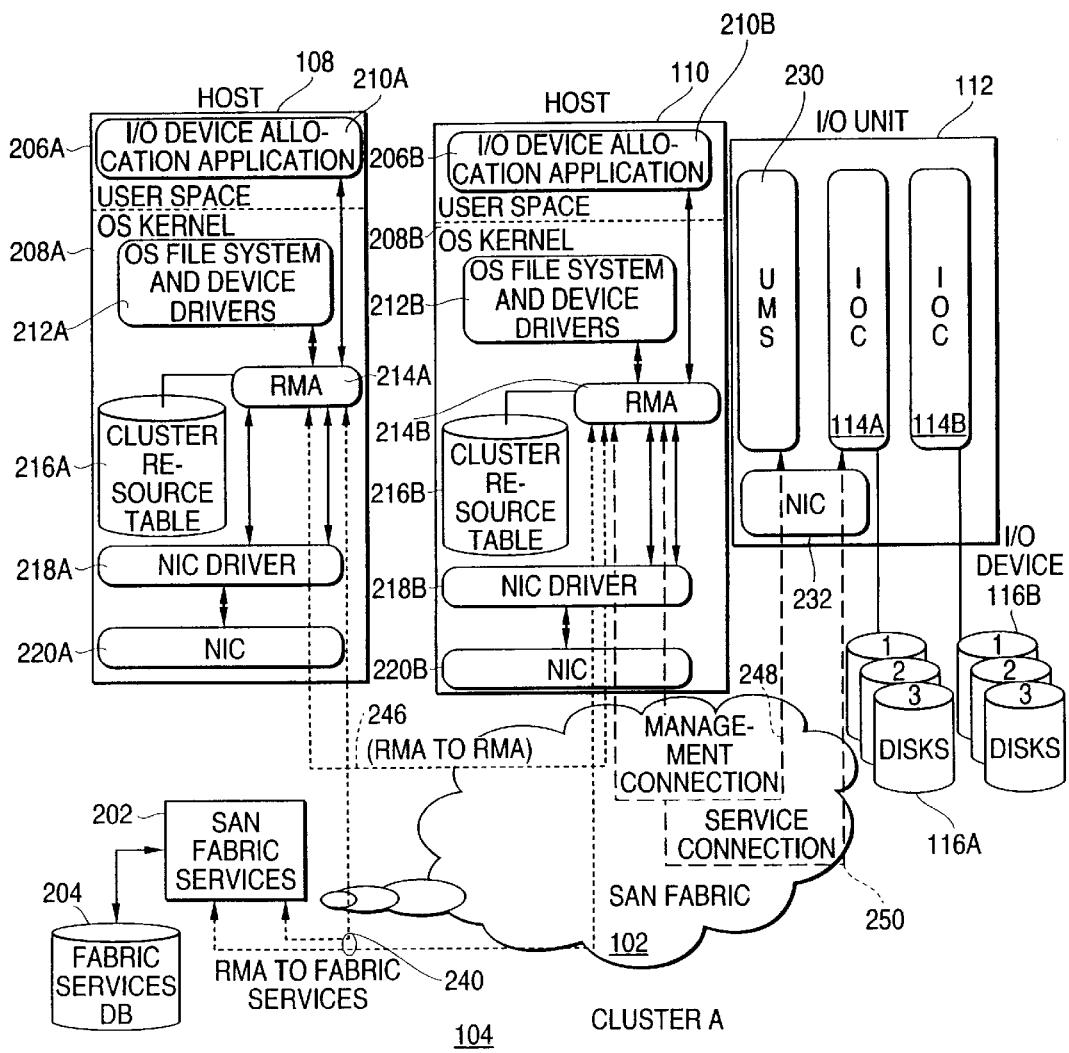
FIG. 2 is a block diagram illustrating an example cluster according to an embodiment of the present invention.

FIG. 2 is a block diagram illustrating an example cluster according to an embodiment of the present invention. FIG. 2 illustrates a portion of the cluster 104 shown in FIG. 1. Referring to FIG. 2, cluster A 104 includes hosts 108 and 110 and I/O unit 112. Although cluster A 104 may include additional I/O units (such as I/O unit 118 shown in FIG. 1), only I/O unit 112 is shown in FIG. 2, for the sake of simplicity and brevity. The hosts 108 and 110 and I/O unit 112 are connected to SAN fabric 102. A SAN fabric services 202 is connected to the SAN fabric 102, and a fabric services database (DB) 204 is connected to the SAN fabric services 202. SAN fabric services 202 provides certain fabric services to assist with the management and organization of the cluster.

The fabric services database 204 includes a description of the fabric topology for each cluster in the SAN 100 (FIG. 1), including a list of the hosts and I/O units within each cluster, an identification of each (identification whether each is an I/O unit or a host), the address of each host or I/O unit (e.g., the network address). In one example embodiment, the network addresses are provided as Medium Access Control (MAC) addresses. Other types of network addresses can be used. The database 204 also includes allocation or ownership information for each of the I/O units within each cluster, including an indication as to the owner of each I/O unit (e.g., an indication as to which host or hosts owns or has access to each I/O unit). Therefore, the database 204 identifies the ownership of the I/O units (e.g., the specific allocation of I/O units to one or more hosts within the network). An I/O unit can be allocated to (i.e., owned by) one or more hosts within a cluster. Thus, an I/O unit can be dedicated to a single host in a cluster, or can be a shared resource which can be used by multiple hosts.

Referring to FIG. 2, each I/O unit includes one or more I/O controllers (IOCs) for controlling the connected I/O devices. Each I/O controller controls one or more connected I/O devices (e.g., disk drives, tape drives). Each I/O unit and I/O controller will typically each include a processor and memory (such as random access memory). Although not necessary, each I/O device can also include control logic.

Also, each I/O unit contains one or more Network Interface Controllers (NICs), with each NIC having a different MAC address. Each I/O controller within an I/O unit can be addressed using a MAC address of the NIC on the I/O unit and an I/O controller number. Each I/O device attached to the I/O controller can then be accessed or addressed using the MAC address of the NIC, the I/O controller number and the I/O device number that identifies the specific I/O device attached to the I/O controller.

As shown in the example system of FIG. 2, the I/O unit 112 includes a unit management service (UMS) 230 for managing and controlling I/O unit 112. I/O unit 112 further includes I/O controllers (IOCs) 114A and 114B. I/O controller 114A is connected to I/O devices 116A, including devices 116A(1), 116A(2) and 116A(3). Similarly, I/O controller 114B is connected to I/O devices 116B, including devices 116B(1), 116B(2) and 116B(3). UMS 230 and the I/O controllers 114A and 114B are connected to the SAN fabric 102 via a network interface controller (NIC) 232.

Host 108 includes a user space 206A (e.g., where user applications reside) and the operating system (OS) kernel space 208A (or OS). An I/O device allocation application 210A resides in the user space 206A of host 108 and can be used by a network or system administrator to assign I/O resources to one or more hosts. As well understood by those skilled in the art, each host may include a processor, memory and other logic. As for memory, each host may include both random access memory (RAM) and permanent storage memory, such as a hard disk drive (HDD), a non-volatile RAM or Flash Memory device.

There may be several operating system (OS) components within the OS kernel space 208A of host 108. The host OS kernel space 208A includes an OS file system and device drivers 212A for managing files and for identifying I/O resources available to host 108. The OS kernel space 208A of host 108 also includes a software agent, called the I/O resource management agent (RMA) 214A. The RMA 214A is a component of the host OS that is responsible for the management of an I/O device resource table, called the cluster resource table (CRT) 216A. The RMA 214A is responsible for the initial creation, storage, retrieval and update of the CRT 216A. An instance of the RMA runs on each host in the cluster, and a corresponding copy of a CRT resides on each host in the cluster. A network interface controller (NIC) 220A and a NIC driver 218A connected thereto are used by the RMA 214A to connect to the SAN fabric 102. RMA 214A uses the NIC 220A and the NIC driver 218A to establish communications over the SAN fabric 102 with other RMAs, I/O resources (such as I/O units or I/O controllers) and the SAN fabric services 202.

The other hosts in cluster 104 may include a similar structure as host 108. In particular, the OS of each host includes an RMA 214 and a CRT 216. For example, host 110 includes a copy of the I/O device allocation application 210B within its user space 206B, an OS file system and device drivers 212B, an RMA 214B, a CRT 216B, a NIC driver 218B and a NIC 220B within kernel space 208B.

As described in greater detail below, the RMA on each host communicates with the fabric services 202 (see example RMA-to-fabric services communication 240, FIG. 2) to obtain a list of the hosts and I/O units in its cluster. The RMA within a host then communicates with other RMAs and the I/O units within its cluster (see example RMA-to-RMA communication 246, FIG. 2) to update its CRT to reflect the current allocation of I/O resources within the cluster. The OS file system and device drivers 212A of the host then uses the updated CRT to determine which I/O resources are available to the host 108 for use (e.g., for reading from and writing to).

Example of the Information Stored in Fabric Services Database 204

FIG. 3 illustrates an example of the type of information stored in the fabric services database 204, illustrated in FIG. 2. Each row 302 or entry of FIG. 3 provides information describing each host or I/O unit in the SAN 100. According to the example embodiment illustrated in FIG. 3, the information stored in the fabric services database 204 includes a global unique identifier (GUID) 304 for the host or I/O unit (which is an identifier that uniquely identifies the host or I/O resource), a device type 306 (e.g., indicating either host or I/O unit), the network address (e.g., MAC address) 308 of the host or I/O unit, a cluster 310 of which the device is a member (e.g., either cluster A or cluster B) and ownership information 312 that identifies which host (or hosts) owns the I/O unit (i.e., which host or hosts in the cluster have access to the I/O unit for reading and writing).

For example, row 3 in FIG. 3 indicates that I/O unit 112 (see, e.g., FIGS. 1 or 2) is shared by both host 108 and host 110. Row 4 indicates that I/O unit 118 is dedicated to host 110, and thus, may not be accessed by host 108. Even though I/O unit 112 is shared by hosts 108 and 110, the individual I/O controllers and I/O devices connected to I/O unit 112 may be dedicated to just one of host 108 or host 110.

The fabric services database 204 (FIG. 3) also may include a time and date stamp 314 (or version number) that indicates when the network information in the database 204 was updated by the I/O device allocation application 210

(e.g., indicates when the I/O resources were last assigned or reallocated). The I/O device allocation application 210 may be run from any host, or from a separate or dedicated management host or computer. However, only one instance of the I/O device allocation application 210 may run at a time (i.e., on only one host), to avoid a conflict in the allocation of I/O resources.

Example of a Cluster Resource Table (CRT)

FIG. 4 illustrates an example of the type of information stored in a cluster resource table (CRT) stored by host 108. The example CRT illustrated in FIG. 4 may be stored as CRT 216A in the OS of host 108. The example CRT 216A illustrated in FIG. 4 is the CRT for cluster A (because host 108 is a part of cluster A, FIG. 1).

As noted above, each I/O controller within an I/O unit can be addressed using a MAC address of the NIC on the I/O unit and an I/O controller number. Each I/O device attached to the I/O controller can then be accessed or addressed using the MAC address of the NIC, the I/O controller number and the I/O device number that identifies the specific I/O device attached to the I/O controller. Each I/O unit or host can include more than one NIC. For the sake of brevity and simplicity, each host and I/O unit in the examples described herein includes only one NIC. Thus, when a host or I/O unit only has one NIC, the MAC address of the host is the MAC address of the host's NIC, and the MAC address of the I/O unit is the MAC address of the I/O unit.

The example CRT illustrated in FIG. 4 includes 11 rows 402 and each row 402 includes specific information describing each host or I/O resource. Each row 402 identifies a GUID 404 for the host or I/O resource. A type field 406 identifies the type of device or resource, such as a host, I/O unit, I/O controller or I/O device. The CRT of FIG. 4 also includes a network (e.g., MAC) address 408 of the host NIC or I/O unit NIC. Because I/O controllers and I/O devices are addressed or accessed through the MAC address of their I/O unit NIC, the listed NIC MAC Address for controllers and devices is the address of their I/O unit NIC.

Each row 402 also includes a controller/device number (IOC/IOD number) field 410 that identifies the number of the I/O controller within an I/O unit, or the number of the device attached to an I/O controller (only for I/O controllers or I/O devices). A parent field 412 is provided to identify the configuration or hierarchical relationship of an I/O controller or an I/O device and ownership information 414 (to identify whether ownership of the I/O resource is shared or dedicated, and an identification of which host(s) own the resource). The CRT may also include a time and date stamp 420 that identifies the time and date that the CRT was last updated by the RMA (e.g., RMA 214A). A version number (or similar information indicating how current the CRT is) indicating a version of the CRT may be used instead of a time and date stamp 420.

The parent field 412 in the CRT 216A (FIG. 4) describes the topology or hierarchical relationship between different I/O resources or devices. The parent field identifies which I/O controllers are connected to which I/O units, and which I/O devices are connected to which I/O controllers. The parent field 412 identifies the I/O entity or resource at the next higher level to which the I/O resource belongs or is connected (e.g., identifies the I/O controller to which a device is connected, or identifies an I/O unit to which an I/O controller is connected).

The ownership of connected I/O resources should be consistent within an I/O unit and its connected controllers and devices. In other words, the ownership of lower levels of I/O resources is limited to the ownership of the I/O entities at higher levels. For example, if the I/O unit is shared among two hosts, each connected I/O controller (and the connected I/O devices) can be dedicated to one of the hosts or shared among both hosts (but not owned by hosts other than those which own the I/O unit). However, if an I/O unit is dedicated to one host, the I/O controllers and devices connected thereto should also be dedicated to the same host as the connected I/O unit. This describes the configuration or arrangement of the CRT according to just one embodiment of the invention. Other configurations or arrangements can be used.

Referring to FIGS. 1 and 4, cluster A includes hosts 108 and 110 and I/O units 112 and 118. The ownership field 414 in CRT 216A (FIG. 4) indicates at row 3 that I/O unit 112 is shared by hosts 108 and 110. Rows 4 and 7 indicate that I/O controllers 114A and 114B are connected to I/O unit 112, as indicated by the parent field 412 for rows 4 and 7. Both I/O unit 114A and I/O unit 114B are shared by both hosts 108 and 110, as indicated by the ownership field 414 for rows 4 and 7. I/O controller 114A includes two connected I/O devices—I/O device 116A1 (device number 1, IOD1) and I/O device 116A2 (device number 2, IOD2), as shown in rows 5 and 6 of FIG. 4. I/O device 116A1 is dedicated to host 108 (see row 5), while I/O device 116A2 is dedicated to host 110 (see row 6, FIG. 4). I/O device 116B1 is connected to I/O controller 114B, and is shared by both hosts 108 and 110 (see row 8, FIG. 4).

Row 9 of FIG. 4 indicates that I/O unit 118 is dedicated to (i.e., owned exclusively by) host 110. Row 10 of FIG. 4 indicates that I/O controller 120 is connected to I/O unit 118, and row 11 indicates that I/O device 122A is connected to I/O controller 120 (see parent fields 412 for rows 10 and 11). Thus, the connected I/O controller 120 and the connected I/O device 122A are also dedicated to host 110 (see ownership fields 414 of rows 10 and 11).

As described above, according to an example embodiment of the present invention the I/O resources may be separately allocated down to the I/O device level. In other words, each I/O device can be separately allocated within the I/O unit (so long as the allocation of the I/O devices is consistent with the allocation of higher levels). For example, an I/O unit can be shared by a large group of hosts, each connected I/O controller shared among a subset of the large group of hosts, and each connected I/O device is dedicated to one host within a subset of the connected controller. However, various levels of granularity of allocation can be selected by the system administrator (through setting parameters in the I/O device allocation application 210) for allocating resources. For example, the SAN can be configured such that all I/O devices must be allocated to the same host or hosts which own the connected I/O controller (i.e., the I/O devices cannot be allocated separately from their corresponding I/O controllers). Furthermore, even finer granularity can be obtained below the I/O device level by allowing various partitions or address ranges of an I/O device to be separately allocated among different hosts. These are simply examples of allowing a selectable level of granularity in the allocation of I/O resources within the SAN 100.

FIGS. 3 and 4 merely provide examples of the network information stored on the database 204 and the CRT stored in a host. The network information in database 204 and the CRT can include less or more information, and may be provided in different formats. For example, additional fields can be provided to describe the model or size of an I/O device, vendor ID, features or attributes of a host or I/O device, a mode of operation (e.g., 32-bit mode or 64-bit mode), or other information, etc.

Operation

The process of a host obtaining an updated list of I/O resources that are allocated to it will now be described according to an example embodiment of the present invention. This process will be described for host 108. The other hosts in the cluster 104 may operate in a similar manner.

When a host (such as host 108) is booted, several functions are performed, including loading of the OS into RAM from permanent memory (such as hard disk drive, NVRAM or Flash Memory) and determining which I/O resources are available to host 108. The host OS relies upon the CRT 216A for information identifying the I/O devices in the cluster that are available to the host 108. However, before the OS can use the CRT to identify I/O resources available to the host 108, it should be ensured that the information in the host's CRT 216A is up-to-date (i.e., accurate or current).

When host 108 in cluster 104 is booted, the RMA 214A first retrieves the local copy of the CRT 216A from a permanent or persistent storage device (e.g., stored on a hard disk drive, NVRAM, or Flash Memory of the host 108). The CRT 216A is stored on a persistent storage device so that once an I/O resource is allocated to a host, the allocation information is saved across boots (i.e., stored even though the host is turned off or is off-line). If no CRT exists for the host (i.e., the first boot for the host), the RMA 214A creates an empty CRT. Next, the RMA 214A needs to update the CRT 216A with any changes that have occurred while its host was down (e.g., turned off, off-line, disconnected). This CRT is then updated based on information obtained from other hosts and I/O resources within the cluster for host 108 (i.e., within cluster 104).

FIG. 5 is a flow chart illustrating the process of updating of the CRT 216A according to an example embodiment of the present invention. Referring to the flow chart of FIG. 5, at block 505, the RMA 214A of host 108 establishes a connection with SAN fabric services 202 and obtains a list of the hosts and I/O units that are part of its cluster membership (i.e., a list of the hosts and I/O units that are part of its cluster). RMA 214A can obtain the list of hosts and I/O units in the cluster via an interprocess communication (IPC) connection 240 (FIG. 2) between the RMA 214A and the fabric services 202. The fabric services 202 obtains the list of hosts and I/O units that are members of the cluster 104 (the cluster for host 108) from fabric services database 204 (e.g., which may be all or a subset of the information stored in the database 204) and provides it to the RMA 214A. The list includes, for example, an identification of each host or I/O resource (I/O unit, controller or device), and the network address of each host or I/O unit, and may include additional information such as the GUID of the host of I/O unit.

However, according to an example embodiment of the invention, network information stored at the fabric services database 204 does not includes ownership or topology information for the specific I/O controllers and specific I/O devices at each I/O unit. Rather, according to an embodiment of the invention, the database 204 includes only information describing hosts and I/O units. As a result, the list obtained by host 108 from fabric services 202 at block 505 does not typically identify or provide information regarding the I/O controllers or I/O devices connected to each I/O unit. According to this example embodiment, the information regarding the specific I/O controllers and I/O devices must be obtained from the other hosts and/or the I/O units in the cluster. As a result, the list obtained from the fabric services 202 provides a list of hosts and I/O units which the RMA should contact or query to obtain more detailed information regarding the topology of the cluster and the allocation or ownership of I/O resources within the cluster.

At block 510, RMA 214A establishes an IPC connection 246 (FIG. 2) to each of the RMAs in the host's cluster (e.g., cluster A) and obtains copies of their CRT. Alternatively, RMA 214A may initially obtain only the time and date stamp (or version number) of each CRT from the other hosts in the cluster (this is enough information to determine which CRT is the most current version, which is relevant to block 515 below). As noted above, the RMA 214A obtained the network address of each host in the cluster from the fabric services 202 at block 505. These host addresses are used by RMA 214A for the RMA-to-RMA connections 246.

At block 515, the RMA 214A compares the time and date stamp (or version number) on each CRT obtained from other hosts to the time and date stamp on its local CRT. RMA 214A updates its local CRT (block 515) to the most current or latest version of CRT found in the RMAs. RMA 214A obtains the most current CRT if it obtained only time and date stamps at block 510. The RMA 214A maintains its local CRT if its local CRT is the latest or most current version (i.e., CRT is not updated). In this manner, rather than requiring the system administrator to provide I/O resource allocation information to a host each time the host re-boots or connects to the network, each host can simply query each of the other hosts in the network and update its CRT with the latest or most current version of the CRT obtained from the other RMAs in the cluster.

At block 520, the RMA 214A updates its local CRT (which may have been replaced in block 515) based on the actual I/O unit and I/O device configuration of the SAN. While the host 108 was down or disconnected from the SAN, one or more I/O units, I/O controllers or I/O devices may have been added to or removed from the cluster, and are not reflected in the most recent CRT obtained by the RMA in step 515. Thus, the RMA 214A contacts each of the I/O resource to directly obtain this actual I/O resource configuration/topology information.

For block 520, the RMA 214A first establishes a management connection 248 with the UMS 230 of each I/O unit in the cluster. The RMA 214A already obtained the cluster membership information, including the network address for the NIC each I/O unit in the cluster at block 505. Over each management connection 248 (FIG. 2), the RMA 214A requests and obtains from the UMS 230 a list of the I/O controllers found within that I/O unit (e.g., connected to that I/O unit), their I/O controller numbers. Next, RMA 214A establishes a service connection with each I/O controller in the cluster (e.g., using the NIC MAC address of the I/O unit and the specified I/O controller number). Over each service connection 250 (FIG. 2) to an I/O controller, the RMA 214A obtains a list of the I/O devices attached to the I/O controller and their I/O device numbers. Additional information may also be obtained, which may include the fields provided in the CRT of FIG. 4. In this manner, the RMA 214A can directly learn or discover the network configuration for I/O resources within its cluster, but does not obtain ownership information from the I/O units and controllers. The host's CRT is then updated based on this information.

Some new I/O devices may have been added since the last allocation of I/O resources by the I/O device allocation application 210, and thus, will not yet be allocated to any host (i.e., are not yet owned by any host). The RMA 214A marks these devices in its CRT as unallocated. These new devices will be detected by the query or communication to the I/O units and I/O controllers. If a new I/O controller or device is discovered, a new entry in the CRT is created and the ownership field is initially set to "unallocated" or "unassigned." These devices will be allocated to hosts later by the system administrator by running the I/O device allocation application 210. The RMA 214A then places a new time and date stamp on its local CRT to indicate the time and date that its CRT was updated.

At block 525, if any changes were made to its original CRT, the RMA 214A stores the updated CRT in its persistent or permanent storage device. This allows the host 108 to retain its updated CRT across system boots.

At block 530, the RMA may establish a connection to each of the hosts in the cluster and provide its updated CRT to the other hosts. The other hosts compare the time and date stamp of the received CRT to the time and date stamp of their local CRTs to determine if their local CRTs should be replaced with the received (updated) CRT. The hosts in the cluster replace their local CRT with the received CRT only if the received CRT is more current or more recent than their local CRT.

After the OS has finished booting and the RMA 214A has completed updating the CRT, the OS file system and device drivers 208A identifies the I/O devices that are owned by or available to the host based on its CRT. For example, the CRT of FIG. 4 indicates that I/O device 116A1 (a HDD) and I/O device 116B1 are available to host 108.

At any time, the system administrator can allocate or assign (or reassign or reallocate) the I/O devices or I/O resources in a network to the various hosts within the cluster (as either shared or dedicated ownership). The system administrator can even reallocate an I/O device to a new cluster and one or more new hosts in the new cluster. The system administrator then runs the I/O device allocation application 210 from one of the hosts. The allocation application program 210 allocates (or assigns) or re-allocates I/O resources by updating the ownership field in the CRT, either directly, or by communicating this information to the host's RMA. For example, for an existing I/O device, the ownership field in the CRT would be changed to reflect the new allocation or new ownership for a device assigned by the system administrator. If a device is new, then a row in the CRT is added or created for the new I/O device and would indicate, for example, a GUID, a Type, NIC MAC address, Number, parent, and the owner for the device as indicated in the example CRT of FIG. 4, and possibly other information. A device that has been physically disconnected or removed from the SAN would have its row or entry in the CRT deleted or otherwise marked as invalid. This RMA on the host running the I/O device allocation application) then communicates to other hosts within the cluster to provide them with these CRT changes or with a copy of this updated CRT. This allows the system administrator to run the I/O device allocation application 210 from any host in the cluster to assign (or reassign or reallocate) I/O devices or resources to any host or hosts within the cluster, and then communicate this I/O resource allocation (e.g., the updated CRT) to the other hosts in the cluster.

According to another aspect of the present invention, a host's RMA may periodically poll the fabric services 202 to identify new I/O units. The RMA may poll both the previously known and the new I/O units to identify any new I/O controllers, and may poll the various I/O controllers (including any new controllers) to identify new I/O devices that have been added to the cluster. After discovering these newly added I/O devices, the RMA updates its CRT accordingly.

As described above, the present invention provides a technique for I/O resources to be allocated to one or more hosts in a cluster. The present invention also allows hosts to obtain updated information (e.g., a cluster resource table or CRT) describing the configuration and allocation of I/O resources in the cluster. To update a CRT, a host's I/O resource management agent (RMA) 214A obtains a list of all hosts and I/O units and their network addresses from the fabric services 202. The RMA then queries each host to obtain the CRTs of each of the host's in the cluster. The RMA replaces its local CRT with the most current version of the CRT (e.g., based on a time and date stamp or version of each CRT). The host's RMA then queries each I/O unit to identify the I/O controllers and their controller numbers within each I/O unit. The RMA then queries each I/O controller in the cluster to identify the I/O devices attached to each I/O controller. The RMA then updates its CRT based on this information.

Moreover, the present invention advantageously provides a single interconnect or network (e.g., SAN fabric 102) for both (1) I/O transactions, such as I/O data packets sent between hosts and their I/O devices for read and write operations, and (2) the connections for allocating resources and obtaining updated I/O resource information (e.g., RMA-to-RMA connections, RMA-to-fabric services connections, management connections and service connections). The present invention allows multiple clusters to coexist on a single interconnect or network because I/O devices and hosts can be allocated among different clusters. The I/O device allocation application can be run from any host in the cluster to allocate any I/O device to any host(s) in the cluster. Hosts can automatically obtain updated I/O resource information from other hosts and I/O resources in the cluster and can discover new I/O devices that have been added or removed from the cluster. The host then updates its CRT accordingly and can inform other hosts in the cluster of the CRT changes (e.g., changes to the I/O resource allocation or configuration in the cluster).

Moreover, the host's RMA and its I/O resource table (or CRT) are provided within or as a part of the host's operating system, rather than as a management program residing at a higher level or in user space. If the CRT is provided outside the operating system, system boot must be performed from a local storage device. Because the CRT is provided within the operating system, the host can boot or initialize itself from any I/O device in the network (e.g., the host OS first identifies the network address of the I/O device where it should obtain the OS kernel to boot-up, rather than booting from a local storage device). As a result, the present invention does not require local storage devices, but rather, enables networks to be configured where all the I/O devices are distributed on the network (or SAN).

An embodiment of the present invention provides a distributed technique for updating a table at a host that provides information describing the configuration and allocation of I/O resources within a cluster because each host queries other hosts and I/O resources in the cluster to obtain updated information. Rather than querying each host and I/O resource in the cluster, a host can alternatively obtain updated I/O resource information from a central source, such as the fabric services 202 or database. This alternative embodiment would require that the central source or database 204 would store the current configuration and resource allocation information (e.g., all the information in FIGS. 3 and 4 describing all aspects of the network including ownership, addresses and relationships of each host and I/O resource).

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the present invention has been described with reference to a storage area network (SAN), the various aspects of the present invention are applicable to a wide variety of networks, including Local Area Networks (LANs), Wide Area Networks (WANs), the Internet, etc.

What is claimed is:

1. A method of updating a local I/O resource table at a host in a network cluster, the I/O resource table identifying the configuration and the allocation of I/O resources in the network cluster, said method comprising:

obtaining a list of other hosts in a network cluster including their addresses;

establishing a connection to one or more of the other hosts in the cluster;

obtaining at least a portion of an I/O resource table from one or more of the other hosts in the network cluster;

identifying the I/O resource table obtained from the other hosts in the cluster that is the most current; and updating the host's local I/O resource table based on the most current I/O resource table.

2. The method as claimed in claim 1, wherein each I/O resource table includes a time and date stamp, and said step of obtaining at least a portion of an I/O resource table from each of the other hosts comprises obtaining at least a time and date stamp of the I/O resource table from each of the other hosts.

3. The method as claimed in claim 1, wherein said step of obtaining at least a portion of an I/O resource table comprises obtaining the I/O resource table from each of the other hosts in the network cluster.

4. The method as claimed in claim 1, wherein said step of updating comprises updating the host's local I/O resource table based on the most current I/O resource table if the most current I/O resource table is more current than the host's local I/O resource table.

5. The method as claimed in claim 1, wherein each I/O resource table identifies a network address and owner of each of a plurality of I/O resources in the host's network cluster.

6. The method as claimed in claim 5, wherein the I/O resource table identifies an owner by identifying one or more hosts in the network cluster that have access to or may use the I/O resource.

7. The method as claimed in claim 1, wherein each of the other host's I/O resource table includes a time and date stamp or version number, and said step of identifying comprises identifying the I/O resource table obtained from the other hosts in the network cluster that is the most current based on a comparison of the time and date stamp or version number of each I/O resource table.

8. A method of updating an I/O resource table at a host in a network cluster, the I/O resource table identifying the configuration and the allocation of I/O resources in the network cluster, said method comprising:

establishing a connection to a central database;

obtaining from the central database a list of other hosts and I/O units in a network cluster including their addresses;

establishing a connection to one or more of the other hosts in the cluster;

obtaining at least a portion of an I/O resource table from one or more of the other hosts in the network;

identifying the I/O resource table of the other hosts in the cluster that is the most current;

updating the host's local I/O resource table based on the most current I/O resource table;

establishing a connection to one or more I/O units in the cluster;

determining from the I/O units if there have been I/O devices added or removed from the cluster;

further updating the host's local I/O resource table if I/O devices have been added or removed from the cluster.

9. The method as claimed in claim 8, wherein said step of determining comprises:

obtaining a list of the I/O controllers included within one or more I/O units and identification information of each I/O controller within the one or more I/O units;

establishing a connection to one or more of the I/O controllers; and obtaining from each I/O controller a list of I/O devices connected to the I/O controller.

10. The method as claimed in claim 9, wherein said step of obtaining a list comprises obtaining a list of the I/O controllers within one or more I/O units and a controller number of each I/O controller within the one or more I/O units.

11. A computer program encoded on a computer readable medium for updating a local I/O resource table at a host in a network cluster, the I/O resource table identifying the configuration and the allocation of I/O resources in the network cluster, the computer program causing the following to be performed when executed by a computer:

obtaining a list of one or more of the other hosts in a network cluster including their addresses;

establishing a connection to one or more of the other hosts in the cluster;

obtaining at least a portion of an I/O resource table from one or more of the other hosts in the network;

identifying the I/O resource table obtained from the other hosts in the cluster that is the most current; and updating the host's local I/O resource table based on the most current I/O resource table.

12. A network cluster comprising:

a database storing a list of hosts in the cluster and their addresses;

a plurality of I/O resources;

a plurality of hosts each coupled over a network to each of the I/O resources, each host including:

an I/O resource table stored in a local storage device, each I/O resource table identifying a configuration and an allocation of the I/O resources in the cluster;

an I/O resource management agent provided within the host's operating system, the I/O resource management agent obtaining the list of the hosts in the cluster and their addresses from the database, the I/O resource management agent establishing a connection to one or more other hosts in the cluster to obtain at least a portion of the I/O resource table from the other hosts and then updating its local I/O resource table if the other host's I/O resource table is more current that its local I/O resource table.

13. A host provided in a network cluster that includes a plurality of hosts and plurality of I/O resources coupled together over a network, the cluster including a central database storing a list of the hosts in the cluster and their addresses, each host comprising:
an I/O resource table stored in a local storage device, the I/O resource table identifying a configuration and an allocation of the I/O resources in the cluster;
an I/O resource management agent provided within the host's operating system, the I/O resource management agent obtaining the list of the hosts in the cluster and their addresses from the database, the I/O resource management agent obtaining at least a portion of the I/O resource table from one or more of the other hosts in the cluster and then updating its local I/O resource table if any of the other host's I/O resource table is more current that its local I/O resource table.

14. The host as claimed in claim 13, wherein the central database stores a list of the hosts and the I/O units in the cluster and each of their addresses.

15. The host as claimed in claim 14, wherein said I/O resource management agent comprises an I/O resource management agent provided within the host's operating system, and configured to obtain the list of the hosts and I/O units in the cluster and their addresses from the central database, obtain at least a portion of the I/O resource table from each of the other hosts in the cluster and then update its local I/O resource table if any of the other host's I/O resource table is more current that its local I/O resource table, establish a connection to one or more of the I/O units in the cluster, determine if any I/O devices coupled to each I/O unit have been added or removed and update its local I/O resource table accordingly.

16. The host as claimed in claim 13, wherein said I/O resource table comprises a cluster resource table.

17. A network comprising:
a fabric;
one or more clusters of hosts and I/O units interconnected via the fabric; and
a fabric services database provided in the fabric to store a list of hosts and I/O units and respective network addresses in one or more clusters;
wherein each host has access to any one of the I/O units in said one or more clusters, and comprises:
an operating system (OS);
a local storage device containing a cluster resource table (CRT) to store information identifying configuration and allocation of I/O resources in one or more clusters; and
a resource management agent (RMA) provided within the operating system (OS) and configured to obtain the list of hosts and I/O units and respective network addresses in the one or more clusters from the fabric services database; obtain at least a portion of the cluster resource table (CRT) from other hosts and then update its cluster resource table (CRT) if the cluster resource table (CRT) from other hosts is more current that its cluster resource table (CRT).

18. The network as claimed in claim 17, wherein the resource management agent (RMA) provided within the operating system (OS) of each host is also configured to establish a connection to one or more other hosts and I/O units in the one or more cluster, determine if any I/O resources coupled to each I/O unit have been added or removed, and update its cluster resource table (CRT) accordingly.

19. The network as claimed in claim 17, wherein the cluster resource table (CRT) of each host within one or more clusters includes a time and date stamp indicating the time and date of last update.

20. The network as claimed in claim 17, wherein the cluster resource table of each host within one or more clusters contains information identifying an owner of the I/O resources by identifying one or more hosts in the one or more clusters that have access to or may use the I/O resources.

21. The network as claimed in claim 18, wherein the cluster resource table (CRT) of each host within one or more clusters includes a time and date stamp indicating the time and date of last update.

22. The network as claimed in claim 17, wherein the cluster resource table of each host within one or more clusters contains information identifying an owner of the I/O resources by identifying one or more hosts in the one or more clusters that have access to or may use the I/O resources.

* * * * *